(12) United States Patent
Ritter et al.

(10) Patent No.: US 11,906,746 B2
(45) Date of Patent: Feb. 20, 2024

(54) LIGHT GUIDE PLATE FOR AUGMENTED REALITY DEVICES

(71) Applicant: Schott AG, Mainz (DE)

(72) Inventors: Simone Monika Ritter, Mainz (DE); Bianca Schreder, Sulzbach (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 17/956,258

(22) Filed: Sep. 29, 2022

(65) Prior Publication Data
US 2023/0105927 A1    Apr. 6, 2023

(30) Foreign Application Priority Data

Sep. 30, 2021 (DE) ..................... 10 2021 125 439.6

(51) Int. Cl.
*G02B 27/01* (2006.01)
*F21V 8/00* (2006.01)

(52) U.S. Cl.
CPC ....... *G02B 27/0172* (2013.01); *G02B 6/0065* (2013.01)

(58) Field of Classification Search
None
See application file for complete search history.

(56) References Cited

U.S. PATENT DOCUMENTS

| 4,193,807 | A | 3/1980 | Ishibashi et al. |
| 2007/0027016 | A1 | 2/2007 | Ogino et al. |
| 2016/0214881 | A1 | 7/2016 | Mikami |
| 2016/0349517 | A1* | 12/2016 | Miyasaka ............ G02B 5/3016 |
| 2019/0018246 | A1* | 1/2019 | Kogure .................. C03C 3/064 |
| 2022/0206300 | A1* | 6/2022 | Park ..................... G02B 5/1823 |

FOREIGN PATENT DOCUMENTS

JP    2016/143459 A1    9/2016

OTHER PUBLICATIONS

Machine translation of Japanese Patent No. 2016-143459 (12 pages).

* cited by examiner

*Primary Examiner* — Nicholas J Lee
(74) *Attorney, Agent, or Firm* — Taylor IP, P.C.

(57) ABSTRACT

A light guide plate includes: an optical glass, the optical glass having a refractive index $n_d$ of at least 1.75 or of at least 1.80 and including $Nb_2O_5$ in an amount of at least 15 mol % and $P_2O_5$ in an amount of at least 19 mol %, the light guide plate having an internal transmission of at least 0.80 or of at least 0.90, measured at a wavelength of 440 nm and a sample thickness of 10 mm.

12 Claims, No Drawings

LIGHT GUIDE PLATE FOR AUGMENTED REALITY DEVICES

CROSS REFERENCE TO RELATED APPLICATIONS

This claims priority to German patent application no. 10 2021 125 439.6, filed Sep. 30, 2021, which is incorporated herein by reference.

BACKGROUND OF THE INVENTION

1. Field of the Invention

The present invention relates to a light guide plate for an image display device, in particular for Augmented Reality devices. The present invention also relates to the use of the light guide plates according to the present invention in Augmented Reality devices and to an Augmented Reality Device including the light guide plate according to the present invention.

2. Description of the Related Art

Augmented reality (AR) is used for displaying computer-generated perceptual information, in particular visual information, concerning objects residing in the real world. AR devices have recently gained increased importance. In particular, AR displays can be rendered on devices resembling eyeglasses. Such AR devices may display computer-generated visual information projected through or reflected off the surfaces of the lens pieces of the devices. Optical waveguides are a necessary component for the most of such AR devices. In particular, optical waveguides may be provided as light guide plates. Generally, light guide plates are planar wafer-like structures that are used for transmitting light. Thus, light is fed into the light guide plate in one position, is transmitted through the light guide plate and leaves the light guide plate at another position. More precisely, the plate has to guide not only light but also an image, i.e. the light paths may not mix up between in-coupling and out-coupling positions. Notably, the distance that the light travels through the light guide plate is often comparably high and may easily be several cm. In view of the above, light guide plates with high internal transmission are desired. Such light guide plates should also have low weight in order to increase wear comfort, in particular in case of eyeglasses.

What is needed in the art are light guide plates for AR application showing high refractive index, a high transmission together with a low density.

SUMMARY OF THE INVENTION

The present invention provides a light guide plate, optionally for augmented reality applications, including an optical glass, wherein the optical glass has a refractive index $n_d$ of at least 1.75, optionally of at least 1.80, and includes $Nb_2O_5$ in amount of at least 15 mol % and $P_2O_5$ in amount of at least 19 mol %, wherein the light guide plate has an internal transmission of 0.80 or more, optionally of 0.90 or more, measured at a wavelength of 440 nm and a sample thickness of 10 mm.

DETAILED DESCRIPTION OF THE INVENTION

Optionally, the light guide plate is a planar light guide plate. The light guide plate optionally has two main surfaces, wherein optionally the main surfaces have about the same surface area. Optionally, each main surface has a surface area in the range of from 1,000 to 1,000,000 mm², optionally from 3,000 to 750,000 mm², optionally from 5,000 to 500,000 mm², for example from 10,000 to 400,000 mm², from 20,000 to 300,000 mm², from 30,000 to 200,000 mm², from 40,000 to 150,000 mm², from 50,000 to 125,000 mm², or from 60,000 to 100,000 mm.

In one optional embodiment, the light guide plate is a disc-like glass wafer, optionally a glass wafer having a diameter in the range of from 100 mm to 500 mm, optionally from 120 mm to 450 mm, optionally from 140 mm to 400 mm, optionally from 160 mm to 350 mm, optionally from 180 mm to 325 mm, optionally from 200 mm to 300 mm. A diameter of about 200 mm or about 300 mm is particularly optional. Optionally, the diameter of the article is at least 100 mm, at least 120 mm, at least 140 mm, at least 160 mm, at least 180 mm or at least 200 mm. Optionally, the diameter of the article is at most 500 mm, optionally at most 450 mm, optionally at most 400 mm, optionally at most 350 mm, optionally at most 325 mm, optionally at most 300 mm.

In another optional embodiment the light guide plate is an eyepiece for Augmented Reality devices, optionally having a diameter of from 7.5 mm to 120 mm, optionally from 20 to 70 mm and optionally from 40 to 60 mm.

Optionally, the glass of the present invention has a Knoop hardness $H_k$ in a range of from 2 GPa to 10 GPa, optionally from 2.5 GPa to 9.5 GPa, optionally from 3 GPa to 9 GPa, optionally from 3.5 GPa to 8.5 GPa, optionally from 4 to 8 GPa. The Knoop hardness $H_k$ is a measure for permanent surface alterations upon indentation with a diamond indenter. The Knoop hardness $H_k$ is optionally determined according to ISO 9385. Optionally, the Knoop hardness $H_k$ is determined for an indentation force of 0.9807 N (i.e. 0.1 kp) and indentation time of 20 seconds. Optionally, the Knoop hardness $H_k$ is determined using polished glass surfaces at room temperature.

Optionally, the light guide plate of the present invention has a thickness d of from 0.10 mm to 2.0 mm, optionally from 0.15 mm to 1.5 mm, optionally from 0.20 mm to 1.2 mm, optionally from 0.25 mm to 1.0 mm, optionally from 0.30 mm to 0.75 mm, for example from 0.40 mm to 0.60 mm. Low thicknesses are advantageous with respect to the weight of the light guide plate.

Optionally, the light guide plate of the present invention have a low warp, in particular a warp of less than 100 μm, optionally of less than 50 μm, optionally less than 20 μm. The warp may be more than 1 μm, more than 5 μm or more than 10 μm.

Optionally, the light guide plate of the present invention has a low bow, in particular a bow of less than 100 μm, optionally less than 50 μm, optionally less than 20 μm. The bow may be more than 1 μm, more than 5 μm or more than 10 μm.

Warp and/or bow of the light guide plate may be influenced by diameter and thickness of the light guide plates as well as by coatings. Optionally, warp and/or bow of the light guide plates of the present invention are less than 0.1% of the diameter of the light guide plate, optionally less than 0.075% of the diameter of the light guide plate, optionally less than 0.05% of the diameter of the light guide plate, optionally less than 0.025% of the diameter of the light guide plate, optionally less than 0.01% of the diameter of the light guide plate. Warp and/or bow may be more than 0.001% of the diameter of the light guide plate, more than 0.002% of the diameter of the light guide plate or more than 0.005% of the diameter of the light guide plate. Optionally, warp and bow are determined according to SEMI3D1203152015.

Optionally, the TTV (Total Thickness Variation) of the light guide plate is smaller than 2 µm, optionally smaller than 1.8 µm, optionally smaller than 1.6 µm, optionally smaller than 1.5 µm, optionally smaller than 1.4 µm, optionally smaller than 1.3 µm, optionally smaller than 1.2 µm, optionally smaller than 1.1 µm, optionally smaller than 1.0 µm, optionally smaller than 0.75 µm, optionally smaller than 0.5 µm. TTV may be determined based on SEMI MF 1530GBIR. TTV may also be determined based on interferometric measurements of the thickness profile of the light guide plate, for example using an interferometer, in particular an interferometer of Zygo Corporation. In some embodiments, TTV may be at least 0.1 µm or at least 0.2 µm. A very low TTV is particularly advantageous for use of the light guide plate in the AR field. A low TTV may for example be obtained by abrasive processes such as grinding, lapping and/or polishing. Thus, the light guide plate of the present invention is optionally a light guide plate that an abrasive process has been applied to.

The light guide plate of the present invention is also optionally characterized by particularly parallel main surfaces. This may be described in terms of "maximum local slope". In particular, the maximum local slope of the light guide plate is optionally less than 2 arcsec, optionally less than 1.5 arcsec, optionally less than 1 arcsec, optionally less than 0.75 arcsec, optionally less than 0.5 arcsec, optionally less than 0.25 arcsec, optionally less than 0.15 arcsec. The maximum local slope of the light guide plate may be more than 0.01 arcsec, more than 0.05 arcsec or more than 0.1 arcsec. The local slope is optionally determined based on interferometric measurements of the thickness profile of the light guide plate, for example using an interferometer, in particular an interferometer of Zygo Corporation. In particular, the local slope is optionally determined as the angle formed by the line connecting maximum thickness and minimum thickness within a defined lateral dimension. This lateral dimension is optionally in a range of from 1 to 5 mm, for example 1 mm, 2 mm, 3 mm, 4 mm or 5 mm. The local slope is optionally determined across the whole area of the wafer or across at least 50%, at least 60%, at least 70%, at least 80%, at least 90%, at least 95%, or at least 99% thereof, in particular across the whole quality area of the wafer, and the maximum value of the determined local slope values is the "maximum local slope of the wafer".

Optionally, the light guide plate has a surface roughness $R_q$ in a range of from 0.1 nm to 5 nm, for example from 0.15 nm to 3.5 nm, from 0.2 nm to 2 nm, from 0.25 nm to 1.5 nm, from 0.3 nm to 1.0 nm, or from 0.35 nm to 0.75 nm. Optionally, the surface roughness $R_q$ is less than 5 nm, optionally less than 3.5 nm, optionally less than 2 nm, optionally less than 1.5 nm, optionally less than 1.0 nm, optionally less than 0.75 nm, optionally less than 0.5 nm. Surface roughness $R_q$ is optionally determined with white light interferometry (WLI) or atomic force microscopy (AFM). AFM is optional. In the present disclosure, the terms "$R_q$" and "RMS" are used interchangeably. Surface roughness $R_q$ is optionally determined according to DIN EN ISO 4287.

Optionally, the light guide plate has a surface roughness $R_a$ in a range of from 0.1 nm to 5 nm, for example from 0.15 nm to 3.5 nm, from 0.2 nm to 2 nm, from 0.25 nm to 1.5 nm, from 0.3 nm to 1.0 nm, or from 0.35 nm to 0.75 nm. Optionally, the surface roughness $R_a$ is less than 5 nm, optionally less than 3.5 nm, optionally less than 2 nm, optionally less than 1.5 nm, optionally less than 1.0 nm, optionally less than 0.75 nm, optionally less than 0.5 nm. Surface roughness $R_a$ is optionally determined according to ISO DIN EN ISO 4287.

The light guide plate includes or consists of an optical glass, optionally in the form of a planar glass sheet. The light guide plate may include further component in addition to the planar glass sheet, for example one or more optical elements, such a diffractive grating and/or or one or more optical coating each of them on the first and/or the second surface of the light guide plate.

The light guide plate according to the present invention has an internal transmission $T_i$ of 0.80 or more, optionally of 0.85 or more, optionally of 0.90 or more and optionally of 0.95 or more, measured at a wavelength of 440 nm and a sample thickness of 10 mm. In optional embodiments, the light guide plate according to the present invention has an internal transmission (440 nm, 10 mm) of from 0.80 to 0.99, optionally from 0.85 to 0.98 and optionally from 0.90 to 0.97.

The light guide plate is made of an optical glass having a refractive index $n_d$ of at least 1.75, optionally of at least 1.80, optionally of at least 1.85 and particularly optionally of at least 1.90. In some embodiments, the optical glass has a refractive index $n_d$ of at least 1.95. The refractive index $n_d$ denotes the refractive index at a wavelength of 587.6 nm.

In optional embodiments, the optical glass has a refractive index $n_d$ of from 1.75 to 2.2, optionally from 1.78 to 2.1, optionally of from 1.80 to 2.0, and optionally from 1.81 to 1.95.

In optional embodiments, the optical glass has an Abbe number $v_d$ of from 17 to 25, optionally from 18 to 23.

In one optional embodiment the refractive index $n_d$ of the optical glass is from at least 1.80 to less than 1.90. In another optional embodiment, the refractive index $n_d$ of the optical glass is from at least 1.90 to 2.0, optionally at least 1.92 to 1.96. In another embodiment, the optical glass has a refractive index from at least 1.95 to 2.10.

Optionally, the optical glass has a density of less than 5.0 g/cm$^3$, optionally less than 4.1 g/cm$^3$.

Optionally, the optical glass has a ratio of density to refractive index $n_d$ of less than 2.2, optionally less than 2.1.

The optical glass according to the present invention includes $Nb_2O_5$ in an amount of at least 15 mol % and $P_2O_5$ in an amount of at least 17 mol %.

In a optional embodiment, the optical glass includes $Nb_2O_5$ in an amount of at least 17 mol %, optionally at least 19 mol % and optionally of at least 20 mol %. Optionally, the optical glass includes not more than 45 mol %, optionally not more than 35 mol %, more optionally not more than 32 mol % and optionally not more than 28 mol % of $Nb_2O_5$.

In an optional embodiment, the optical glass includes $P_2O_5$ in an amount of at least 19 mol %, optionally at least 20 mol % and optionally of at least 23 mol %. Optionally, the optical glass includes not more than 40 mol %, optionally not more than 35 mol %, more optionally not more than 30 mol % and optionally not more than 28 mol % of $P_2O_5$.

In an optional embodiment, the total amount of $P_2O_5$ and $Nb_2O_5$ in the optical glass is from 35 mol % to 75 mol %, and optionally from 40 to 60 mol %.

In an optional embodiment, the optical glass in the light guide plate of the invention includes the following components in mol %:

| | |
|---|---|
| $Nb_2O_5$ | 15-45 |
| $P_2O_5$ | 17-40 |

-continued

|  |  |
|---|---|
| $B_2O_3$ | 0-12 |
| $SiO_2$ | 0-5 |
| $R_2O$ | 4-40 |
| RO | 0-25 |
| ZnO | 0-5 |
| $TiO_2$ | 0-30 | with $R_2O$ is one or more of $Li_2O$, $Na_2O$, $K_2O$ and $Cs_2O$ and with RO is one or more of MgO, CaO, SrO and BaO.

In another optional embodiment, the optical glass in the light guide plate of the present invention include the following components in mol %:

|  |  |
|---|---|
| $Nb_2O_5$ | 19-35 |
| $P_2O_5$ | 19-30 |
| $B_2O_3$ | 0-10 |
| $SiO_2$ | 0-3 |
| $R_2O$ | 5-37 |
| RO | 0-24 |
| ZnO | 0-4 |
| $TiO_2$ | 0-28 |

$HfO_2$ can be used in amounts of 0.0 to 1.0 mol %, up to 0.5 mol % or up to 0.2 mol % for increasing the refractive index. Some embodiments are free of $HfO_2$.

$Y_2O_3$ can be used in amounts of 0.0 to 5.0 mol %, up to 3.5 mol %, up to 2.0 mol %, up to 1.0 mol %, up to 0.5 mol % or up to 0.2 mol %. Some embodiments are free of $Y_2O_3$.

In some embodiments, the optical glass consists of at least 95.0 mol %, such as of at least 98.0 mol % or of at least 99.0 mol % of the components described here, such as of the components listed in the table above. In some embodiments, the glass substantially completely consists of these components.

In some embodiments, the glass is substantially free of one or more constituents selected from $La_2O_3$, $Gd_2O_3$, $Y_2O_3$, $GeO_2$, $Ta_2O_5$, MgO, $Li_2O$, $ZrO_2$, $WO_3$ and combinations thereof.

Particularly optional embodiments of the optical glass are essentially free of the optical glass is essentially free of $Bi_2O_3$, $GeO_2$ and/or $WO_3$.

Particularly optional embodiments of the optical glass are essentially free of the optical glass is essentially free of $Bi_2O_3$, $GeO_2$ and $WO_3$.

Particularly optional embodiments of the optical glass are essentially free of the optical glass is essentially free of $Ta_2O_5$, $Bi_2O_3$, $GeO_2$ and $WO_3$.

The optical glass optionally is essentially free of lead.

When in this description is mentioned that the glass is free of a component or that it does not contain a certain component, then this means that for this component at the most it is allowed to be present as an impurity in the glass. This means that it is not added in substantial amounts. According to the present invention, not substantial amounts are amounts of less than 200 ppm, such as less than 100 ppm, less than 50 ppm or less than 10 ppm (m/m).

Due to the contents of niobium, the glass may be free of further expensive components, such as, e.g., tantalum, tungsten and/or germanium. Although in some types of glass they improve diverse optical properties, they are not used here, also due to the fact that it has been found that these components increase, thus worsen, the ratio density/refractive power. The latter is true for, e.g., lanthanum, gadolinium, but also lithium, so in some embodiments these components are not used. Lanthanum and gadolinium, as well as also yttrium, in addition, increase the meltdown temperatures of the mixture and thus the oxygen loss of the melt.

In addition, when these components are used, at crystal seeds and interfaces the tendency to crystallization is increased. $Li_2O$ is known for its corrosiveness with respect to ceramic trough and crucible materials, and therefore, when possible, it is not used or it is used only in low amounts.

The melts of the glass can be refined with the classical refining agents, but since the most interesting glasses can often be melted at temperatures of below 1300° C. and due to their low viscosity also a refining process at rather moderate temperatures is possible, the content of, e.g., $Sb_2O_3$, $As_2O_3$ and/or $SnO_2$ can be reduced (e.g., to <0.1 mol %) for the benefit of the UV transmission, or they can be omitted (pure physical refining). Optionally, the glass may include one or more of the following components with refining effect in the given portions in mol %:

|  |  |
|---|---|
| $Sb_2O_3$ | 0.0 to 0.5 |
| $As_2O_3$ | 0.0 to 0.5 |
| $SnO_2$ | 0.0 to 0.5 |

Particularly optional embodiments are essentially free of $As_2O_3$.

Optionally, the portion of platinum is exceptionally low, because platinum notably decreases the transmission of the optical glass. Optionally, the portion of platinum is lower than 5 ppm, further optionally lower than 3 ppm, further optionally lower than 1 ppm, further optionally lower than 50 ppb, further optionally lower than 20 ppb.

Optional Embodiment A

In one optional embodiment the light guide plate of the present invention is made of an optical glass having a refractive index $n_d$ of at least 1.80 and less than 1.90, and/or an internal transmission $T_i$ (440 nm, 10 mm) of at least 0.90, optionally of at least 0.95.

Optionally, the optical glass in the light guide plate having a refractive index $n_d$ of at least 1.80 and less than 1.90 includes the following components in mol %:

|  |  |
|---|---|
| $Nb_2O_5$ | 19-35 |
| $P_2O_5$ | 19-30 |
| $B_2O_3$ | >0-10 |
| $SiO_2$ | >0-3 |
| $R_2O$ | 10-40 |
| RO | 0-20 |
| ZnO | 0-4 |
| $TiO_2$ | 0-15 |

Optionally, the optical glass has a density of not more than 4.5 g/cm$^3$, optionally not more than 4.1 g/cm$^3$ and particularly optionally not more than 3.8 g/cm$^3$.

In an optional embodiment, the optical glass has a ratio of density/refractive index ($\delta/n_d$) of less than 2.2, optionally less than 2.1.

Optionally, the glass includes more than 0 and not more than 3 mol % of $SiO_2$, optionally the amount of $SiO_2$ is in the range of 1 to 3 mol %.

Optionally, the glass includes $B_2O_3$ in an amount of from 1 to 10 mol %.

Optionally, the optical glass has a ratio of $SiO_2$ and $B_2O_3$ (in mol %) of $SiO_2/B_2O_3$ of more than 0, optionally in the range from 0.1 to 3, optionally in the range from 1 to 2.5.

The optical glass includes one or more alkali metal oxide $R_2O$, wherein R is R is Li, Na. K, and/or Cs, optionally Na and/or K. Optionally, the total amount of $R_2O$ in the optical glass is from 10 to 40 mol %, optionally from 15 to 37 mol %.

In an optional embodiment the optical glass includes at least one of $Na_2O$ and $K_2O$, wherein the total amount of $Na_2O$ and $K_2O$ is from 18 to 37 mol %. In an optional embodiment, the optical glass includes $Na_2O$ in an amount from 15 to 35 mol %, optionally from 19 to 32 mol %.

Optionally, the optical glass includes $K_2O$ in an amount from 1 to 10 mol %, optionally from 5 to 8 mol %. Some optional embodiments of the optical glass are free of $K_2O$.

$Li_2O$ may be included in the optical glass in an amount of not more than 10 mol %, optionally not more than 5 mol % and optionally not more than 2 mol %. Some optional embodiments are free of $Li_2O$.

The optical glass may includes one or more earth alkali metal oxide RO, with R is Mg, Ca, Sr and/or Ba. In an optional embodiment, the optical glass includes a total amount of RO from 10 to 20 mol %, optionally from 13 to 18 mol %. In such embodiments the ratio (in mol %) of $R_2O/RO$ optionally is less than 5, optionally less than 3, optionally less than 2 and optionally less than 1.5. Some optional embodiments however, are free of RO.

The optical glass may include not more than 10 mol %, optionally not more than 6 mol % and optionally not more than 4 mol % of MgO. Optional embodiments are free of MgO.

The optical glass may include not more than 10 mol %, optionally not more than 8 mol % and optionally not more than 6 mol % of CaO. Optional embodiments are free of CaO.

The optical glass may include not more than 10 mol %, optionally not more than 6 mol % and particularly optionally not more than 4 mol % of SrO. Optional embodiments are free of SrO.

The optical glass may include not more than 15 mol %, optionally not more than 13 mol % and optionally not more than 12 mol % of BaO. Some optional embodiments are free of BaO.

The optical glass may include $TiO_2$ in an amount of not more than 15 mol %, optionally not more than 13 mol %. Some optional embodiments are free of $TiO_2$.

The optical glass may include $ZnO_2$ in an amount of not more than 4 mol %. Some optional embodiments are free of $ZnO_2$.

The optical glass may include one or more of $Bi_2O_3$, $GeO_2$, and $WO_3$. However, optional optical glasses are essentially free of such components.

Embodiment B

In one optional embodiment the light guide plate of the present invention includes or consists of an optical glass having a refractive index $n_d$ of at least 1.90, and/or an internal transmission $T_i$ (440 nm, 10 mm) of at least 0.80, optionally of at least 0.84 and optionally of at least 0.90.

Optionally, the optical glass in the light guide plate having a refractive index $n_d$ of at least 1.90 and optionally not more than 2.20, optionally not more than 2.10, and optionally not more than 2.0, includes the following components in mol %:

| | |
|---|---|
| $Nb_2O_5$ | 20-40 |
| $P_2O_5$ | 20-40 |

-continued

| | |
|---|---|
| $B_2O_3$ | 0-10 |
| $SiO_2$ | 0-3 |
| $R_2O$ | 3-22 |
| RO | >0-30 |
| ZnO | 0-4 |
| $TiO_2$ | >0-35 |

Optionally, the optical glass has a density of not more than 5.50 g/cm$^3$, optionally not more than 5.00 g/cm$^3$, optionally not more than 4.5 g/cm$^3$, and optionally not more than 4.0 g/cm$^3$.

In an optional embodiment, the optical glass has a ratio of density/refractive index ($\delta/n_d$) of less than 2.2, optionally of less than 2.1, and optionally less than 2.0.

The optical glass may include not more than 3 mol %, optionally not more than 2 mol % and particularly not more than 1 mol % of $SiO_2$. In one optional embodiment the amount of $SiO_2$ is in the range of from 0.1 to 3 mol %, optionally from 0.5 to 2.0 mol %. Some optional embodiments are free of $SiO_2$.

Optionally, the glass includes $B_2O_3$ in an amount of from 0 to 10 mol %. In one optional embodiment the optical glass includes from 0.5 to 7.5 mol %, optionally from 0.8 to 7 mol % $B_2O_3$. Some optional embodiments are free of $B_2O_3$ The optical glass may include one or more alkali metal oxide $R_2O$, wherein R is Li, Na. K, and/or Cs, optionally Na and/or K. In some optional embodiments, the total amount of $R_2O$ in the optical glass is from 3 to 20 mol %, optionally from 4 to 18 mol %. Some optional embodiments are free of $R_2O$.

In an optional embodiment, the optical glass includes at least one of $Na_2O$ and $K_2O$, wherein the total amount of $Na_2O$ and $K_2O$ is from 3 to 20 mol %.

In some optional embodiment, the optical glass includes $Na_2O$ in an amount from 8 to 18 mol %.

In some optional embodiments, the optical glass includes $K_2O$ in an amount from 1 to 10 mol %, optionally from 4 to 7 mol %. Some optional embodiments of the optical glass are free of $K_2O$.

$Li_2O$ may include in the optical glass in an amount of not more than 10 mol %, optionally not more than 5 mol % and optionally not more than 2 mol %. Optional embodiments are free of $Li_2O$.

The optical glass may include one or more earth alkali metal oxide RO, with R being Mg, Ca, Sr and/or Ba. In an optional embodiment, the optical glass includes a total amount of RO from 1 to 30 mol %, optionally from 2 to 25 mol %.

The optical glass may include not more than 5 mol %, optionally not more than 3 mol % and particularly optionally not more than 1 mol % of MgO. Optional embodiments are free of MgO.

The optical glass may include not more than 5 mol %, optionally not more than 3 mol % and particularly optionally not more than 1 mol % of CaO. Optional embodiments are free of CaO.

The optical glass may include not more than 5 mol %, optionally not more than 3 mol % and particularly optionally not more than 1 mol % of SrO. Optional embodiments are free of SrO.

The optical glass includes more than 0 and not more than 30 mol %, optionally at least 1.0 to 25 mol % BaO.

The optical glass includes $TiO_2$ in an amount of from 5 to 30 mol %, optionally from 8 to 28 mol % $TiO_2$.

The optical glass may include $ZnO_2$ in an amount of not more than 4 mol %, optionally of not more than 2 mol % and optionally not more than 1.5 mol %.

The optical glass may include one or more of $Bi_2O_3$, $GeO_2$, and $WO_3$. However, optional optical glasses are essentially free of such components.

The present invention also relates to a method of producing a light guide plate of the invention, the method including the following steps
   Melting glass raw materials, and
   Cooling the melt.

The method may further include the step of forming the melt prior to cooling the melt.

The method may further include the step of post-processing the light guide plate. For example, one or more cutting processes may be applied. Optionally, the method includes one or more abrasive processes, in particular selected from grinding, lapping and polishing. This is particularly advantageous for achieving a very low TTV. Furthermore, the surface roughness may be specifically adjusted.

Thus, the method optionally includes one or more abrasive processes (optionally selected from the group consisting of grinding, lapping and polishing). However, abrasive processes may induce local stress in the surface of brittle glass material, resulting in subsurface damages (SSDs). Therefore, the method is optionally balanced with respect to the abrasive processes such that they are made sufficiently for achieving a low TTV but not too much in order not to produce too much SSDs.

For example light guide plates may be processed by a double-side processing using planetary cinematics. In such machines, several wafers are processed in one batch, depending on size typically 10-30 wafer. In such machines, quality is based on statistical distribution within a batch and also varying from batch to batch due to interfering of several process conditions.

Exemplary process steps aim high removal rate, so for example grinding with diamond tools. The method may include polishing, in particular several steps, for example using polyurethane-pads, cerium-oxide slurry and a local load of approximately 30 g/cm². It is also possible to use soft pads (felt or others) using finest cerium-slurry (D97 like 1.5-3 microns) or finest diamond tools (grain size <0.1 microns).

The present invention also relates to the use of the light guide plate of the present invention as light guide plate in an augmented reality device.

The present invention also relates to an augmented reality device including a light guide plate of the present invention.

Examples

The example and comparative compositions shown in the following Tables 1 and 2 were melted and their properties were investigated. For some of the glasses the internal transmission was determined.

TABLE 1

Composition in mol % (based on oxide) and properties

| Example | E1 | C2 | E3 | E4 |
|---|---|---|---|---|
| $B_2O_3$ | 9.0 | 4.4 | 1.2 | 1.3 |
| BaO | | 4.2 | 11.6 | 9.1 |
| $Bi_2O_3$ | | 4.0 | 0.4 | |
| $GeO_2$ | | | | |
| CaO | | 0.0 | 5.8 | 5.5 |
| $Cs_2O$ | | | | |
| $Gd_2O_3$ | | | 1.1 | |
| $K_2O$ | 6.9 | | | |
| $Li_2O$ | | 14.6 | 0.0 | |
| $Na_2O$ | 29.0 | 18.1 | 19.1 | 20.2 |
| $Nb_2O_5$ | 21.7 | 22.3 | 31.1 | 26.9 |
| $P_2O_5$ | 20.2 | 24.2 | 27.4 | 26.3 |
| $SiO_2$ | 1.0 | 0.0 | 2.4 | 2.9 |
| $TiO_2$ | 12.2 | 0.0 | | 3.9 |
| WO3 | | 8.1 | | |
| $ZnO_2$ | | | | 3.8 |
| $Sb_2O_3$ | | 0.05 | | |
| $As_2O_3$ | | | | |
| Sum | 100 | 100 | 100 | 100 |
| $n_d$ | 1.8081 | 1.8392 | 1.8467 | 1.8590 |
| vd | 22.76 | 23.90 | 23.90 | 22.70 |
| $CTE_{(20, 300° C.)}$ [$10^{-6}$/K] | 11.25 | 10.17 | 8.63 | 8.13 |
| $T_g$ [° C.] | 534 | 618 | 610 | 605 |
| density d [g/cm³] | 3.32 | 3.49 | 3.79 | 3.70 |
| Ti(440 nm, 10 mm) | 0.96 | — | 0.96 | 0.96 |
| $d/n_d$ | 1.84 | 1.90 | 2.05 | 1.99 |

TABLE 2

Composition in mol % (based on oxide) and properties

| Example | E5 | C6 | C7 | E8 | E9 | E11 | C12 |
|---|---|---|---|---|---|---|---|
| $B_2O_3$ | | | | 6.4 | 0.9 | 3.3 | |
| BaO | 23.6 | 1.2 | 4.6 | 22.0 | 2.8 | 1.5 | 2.3 |
| $Bi_2O_3$ | | 5.1 | 5.4 | | | | 25.5 |
| $GeO_2$ | | 9.1 | 10.0 | | | | 38.7 |
| CaO | | | | | | 0.1 | |
| $Cs_2O$ | | | 2.3 | | | | |
| $Gd_2O_3$ | | | | | | | |
| $K_2O$ | 5.4 | 6.1 | 1.9 | 7.2 | | 6.1 | 3.1 |
| $Li_2O$ | | 13.0 | 16.4 | | | | |
| $Na_2O$ | | 8.2 | | | 17.1 | 10.2 | |
| $Nb_2O_5$ | 31.5 | 24.2 | 23.3 | 29.3 | 25.7 | 25.9 | 14.2 |
| $P_2O_5$ | 27.9 | 22.7 | 25.3 | 22.7 | 29.7 | 24.9 | 16.2 |
| $SiO_2$ | | | | 0.9 | 1.9 | 0.6 | |

TABLE 2-continued

Composition in mol % (based on oxide) and properties

| Example | E5 | C6 | C7 | E8 | E9 | E11 | C12 |
|---|---|---|---|---|---|---|---|
| $TiO_2$ | 10.4 | | | 11.6 | 21.8 | 27.4 | |
| $WO_3$ | | 10.2 | 10.8 | | | | |
| $ZnO_2$ | 1.1 | | | | | | |
| $Sb_2O_3$ | | 0.06 | | | | 0.01 | |
| $As_2O_3$ | | | | | | | |
| Sum | 100 | 100.0 | 100 | 100 | 100 | 100 | 100 |
| $n_d$ | 1.9229 | 1.907 | 1.907 | 1.923 | 1.923 | 1.946 | 2.002 |
| vd | 20.88 | 21.2 | 21.4 | 20.9 | 18.9 | 18.0 | 20.6 |
| $CTE_{(20, 300° C.)}$ $[10^{-6}/K]$ | 6.80 | 9.80 | 7.40 | 7.13 | 7.90 | 6.67 | 8.80 |
| $T_g$ [° C.] | 710 | 498 | 539 | 672 | 650 | 626 | 480 |
| density d [g/cm³] | 4.00 | 4.15 | 4.24 | 3.97 | 3.58 | 3.51 | 5.48 |
| Ti(440 nm, 10 mm) | 0.84 | 0.81 | 0.80 | 0.84 | 0.85 | 0.90 | 0.63 |
| $d/n_d$ | 2.08 | 2.18 | 2.22 | 2.06 | 1.86 | 1.80 | 2.74 |

The compositions according to the present invention show excellent transmission properties, relatively low $T_g$ and a relatively low density and at the same time a relatively high refractive index.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A light guide plate, comprising:
an optical glass, the optical glass having a refractive index $n_d$ of at least 1.75 or of at least 1.80 and including $Nb_2O_5$ in an amount of at least 15 mol % and $P_2O_5$ in an amount of at least 19 mol %, the light guide plate having an internal transmission of at least 0.80 or of at least 0.90, measured at a wavelength of 440 nm and a sample thickness of 10 mm, wherein the optical glass has a ratio of density to the refractive index $n_d$ of less than 2.2 or less than 2.1.

2. The light guide plate according to claim 1, wherein a total amount of $P_2O_5$ and $Nb_2O_5$ in the optical glass is from 35 mol % to 75 mol %.

3. The light guide plate according to claim 1, wherein the optical glass is essentially free of at least one of $Bi_2O_3$, $GeO_2$, and $WO_3$.

4. The light guide plate according to claim 1, wherein the optical glass is essentially free of $As_2O_3$.

5. The light guide plate according to claim 1, wherein the optical glass has an Abbe number $v_d$ of from 17 to 25.

6. The light guide plate according to claim 1, wherein the optical glass comprises the following components in mol %:

| | |
|---|---|
| $Nb_2O_5$ | 15-45 |
| $P_2O_5$ | 17-40 |
| $B_2O_3$ | 0-12 |
| $SiO_2$ | 0-5 |
| $R_2O$ | 4-40 |
| RO | 0-25 |
| ZnO | 0-5 |
| $TiO_2$ | 0-30 | wherein $R_2O$ is at least one of $Li_2O$, $Na_2O$, $K_2O$, and $Cs_2O$, and wherein RO is at least one of MgO, CaO, SrO, and BaO.

7. The light guide plate according to claim 1, wherein the optical glass comprises the following components in mol %:

| | |
|---|---|
| $Nb_2O_5$ | 19-35 |
| $P_2O_5$ | 19-30 |
| $B_2O_3$ | 0-10 |
| $SiO_2$ | 0-3 |
| $R_2O$ | 5-37 |
| RO | 0-24 |
| ZnO | 0-4 |
| $TiO_2$ | 0-28 |

8. The light guide plate according to claim 1, wherein the optical glass has the refractive index $n_d$ of at least 1.80 and less than 1.90 and comprises the following components in mol %:

| | |
|---|---|
| $Nb_2O_5$ | 19-35 |
| $P_2O_5$ | 19-30 |
| $B_2O_3$ | >0-10 |
| $SiO_2$ | >0-3 |
| $R_2O$ | 10-40 |
| RO | 0-20 |
| ZnO | 0-4 |
| $TiO_2$ | 0-15 |

9. The light guide plate according to claim 1, wherein the optical glass has the refractive index $n_d$ of at least 1.90 and comprises the following components in mol %:

| | |
|---|---|
| $Nb_2O_5$ | 20-40 |
| $P_2O_5$ | 20-40 |
| $B_2O_3$ | 0-10 |
| $SiO_2$ | 0-3 |
| $R_2O$ | 3-22 |
| RO | >0-30 |
| ZnO | 0-4 |
| $TiO_2$ | >0-35 |

10. The light guide plate according to claim 1, wherein the total thickness variation (TTV) of the light guide plate is less than 2 μm.

11. The light guide plate according to claim 1, wherein the light guide plate has a surface roughness Rq in a range of from 0.1 nm to 5 nm.

12. An augmented reality device, comprising:
a light guide plate, including:
an optical glass, the optical glass having a refractive index $n_d$ of at least 1.75 or of at least 1.80 and including $Nb_2O_5$ in an amount of at least 15 mol % and $P_2O_5$ in an amount of at least 19 mol %, the light guide plate having an internal transmission of at least 0.80 or of at least 0.90, measured at a wavelength of 440 nm and a sample thickness of 10 mm, wherein the optical glass has a ratio of density to the refractive index $n_d$ of less than 2.2 or less than 2.1.

* * * * *

UNITED STATES PATENT AND TRADEMARK OFFICE
CERTIFICATE OF CORRECTION

| | |
|---|---|
| PATENT NO. | : 11,906,746 B2 |
| APPLICATION NO. | : 17/956258 |
| DATED | : February 20, 2024 |
| INVENTOR(S) | : Ritter et al. |

Page 1 of 1

It is certified that error appears in the above-identified patent and that said Letters Patent is hereby corrected as shown below:

In the Specification

Column 2
Line 8, please delete "100,000 mm.", and substitute therefore --100,000 $mm^2$.--.

Column 10
Line 30, in TABLE 1, in the "Example" column, please delete "WO3", and substitute therefore --$WO_3$--.

Signed and Sealed this
Twenty-seventh Day of January, 2026

John A. Squires
*Director of the United States Patent and Trademark Office*